United States Patent
Houghtaling et al.

[11] Patent Number: 5,882,080
[45] Date of Patent: Mar. 16, 1999

[54] BI-DIRECTIONAL INERTIAL LATCH

[75] Inventors: Bruce D. Houghtaling; Jason L. Williams, both of Battle Creek; Nithammer Egon, Plainwell; Russell J. Burgei, Jackson, all of Mich.

[73] Assignee: Excel Industries, Inc., Elkhart, Ind.

[21] Appl. No.: 721,139

[22] Filed: Sep. 26, 1996

[51] Int. Cl.[6] .................................. B60N 2/10; B60N 2/42
[52] U.S. Cl. .................. 297/378.11; 297/369; 297/216.1
[58] Field of Search .............................. 297/378.11, 369, 297/216.1

[56] References Cited

U.S. PATENT DOCUMENTS

| | | |
|---|---|---|
| 3,848,923 | 11/1974 | Dehler . |
| 4,035,021 | 7/1977 | Krug ........................................ 297/369 |
| 4,252,370 | 2/1981 | Kluting et al. . |
| 4,358,155 | 11/1982 | Osterhold et al. . |
| 4,366,984 | 1/1983 | Klueting et al. . |
| 4,402,547 | 9/1983 | Weston et al. . |
| 4,429,919 | 2/1984 | Klueting et al. . |
| 4,438,974 | 3/1984 | Kresky et al. . |
| 4,634,182 | 1/1987 | Tanaka ............................... 297/378.11 |
| 4,736,986 | 4/1988 | Kato et al. ............................... 297/369 |
| 5,058,240 | 10/1991 | Barda et al. . |
| 5,346,281 | 9/1994 | Hughes . |
| 5,414,897 | 5/1995 | Loewe . |

FOREIGN PATENT DOCUMENTS

| | | | |
|---|---|---|---|
| 2708461 | 8/1978 | Germany | ............................ 297/378.11 |
| 3701419 | 7/1988 | Germany | ............................ 297/378.11 |

*Primary Examiner*—Peter M. Cuomo
*Assistant Examiner*—Anthony D. Barfield
*Attorney, Agent, or Firm*—Banner & Witcoff Ltd

[57] ABSTRACT

A bidirectional inertial latch locks the position of a seat back of a seat on a motor vehicle during rapid changes in velocity. The inertial latch has a bracket mounted on the seat base or bottom. An arm is pivotably mounted on the bracket and securely attached to the seat back, and has a unitary arcuately toothed section for latching engagement. A pawl is pivotally mounted on the bracket and has a center of gravity offset from its pivot axis. The pawl has an arcuate toothed region for engaging the toothed region of the arm, and is pivoted by the inertial force experienced during either sudden deceleration or sudden acceleration to lockingly engage the arm to prevent the movement thereof Preferably the toothed sections of the pawl have at least three teeth.

19 Claims, 4 Drawing Sheets

BI-DIRECTIONAL INERTIAL LATCH

FIELD OF THE INVENTION

The present invention generally relates to mechanisms for securing the position of an adjustable member subject to rapid changes in velocity, and more particularly to latching devices for securing the position of the seat back of an adjustable seat in a motor vehicle.

BACKGROUND OF THE INVENTION

Seats with adjustable seat backs have been widely used in motor vehicles. The adjustability of the angular position of the seat back allows positioning that provides the best support or comfort. The seat back of an automobile seat is typically pivotably mounted relative to a seat base or seat bottom, and a recliner is used for adjusting the seat back position. The recliner typically employs some form of ratchet mechanism and is mounted on the side of the reclining seat. To adjust the position of the seat back, the ratchet mechanism is disengaged so that the seat back can be moved to a new position. The ratchet mechanism is then reengaged to hold the seat back in the new position.

The ratchet mechanism of the recliner typically has engagement teeth. The teeth can be made large to withstand sudden changes in the velocity of a motor vehicle. Using larger gear teeth, however, is associated with the disadvantage of reduced resolution of the position adjustment, and there is increasing demand for ever finer increments of seat back adjustment. Additionally, on certain cars, such as many two-door vehicles, the seat backs of the front seats can be further folded down or dumped to allow access to seats in a second row. Such designs naturally do not lock the seat back when the seat back is being dumped, and increasingly original equipment manufacturers are requiring that seat backs be lockable at all times.

Uni-directional inertial latches have been employed in the recliner to lock or latch the seat back, principally in seats where the seat back may be dumped to allow access to a second row of seating. The inertia latch is typically responsive to gravity as the seat back moves forward to move the latch to a non-engaging release position and is responsive to sudden deceleration created by a rapid reduction in speed to move into a locking position which prevents the seat back from moving forward. To provide even load distribution across the seat typically a second recliner is mounted on the other side of the seat back, connected by a slave wire.

Previous designs for recliners with uni-directional inertia latches are unsatisfactory in that the mechanisms are not responsive to sudden accelerations, and the strength of the seat back and seat base must be enhanced, driving up costs and complexity of the design. A safety locking device is disclosed in U.S. Pat. No. 3,848,923 to Dehler showing several versions of a mechanism for controlling the seat back in response to rapid changes in velocity in two directions. However, the locking devices shown in Dehler are complicated, costly, and require numerous separate components to achieve the desired bi-directionality of the locking device.

In view of the foregoing, it is an object of the present invention to provide an inertial latching device of a simple, elegant design for use on a reclining seat to securely lock the position of the seat back that is bi-directional, that is, the latch secures the seat back position during both rapid acceleration and rapid deceleration.

It is another object of the present invention to provide a bi-directional inertial latch of a simple, elegant design that does not compromise the resolution of seat back adjustment. To that end, it is an object of the present invention to provide a bi-directional inertia latch device for a recliner that may be mounted separately from the recliner.

It is a related object of the present invention to provide such a latching device of simple and elegant design that automatically operates to lock the position of the seat back during sudden changes in speed, and automatically releases the seat back after the sudden change has passed so that it does not interfere with the seat back position adjustment under normal conditions.

It is yet another related object of the present invention to provide such a latching device that is highly reliable in operation.

It is yet another related object of the present invention to provide such a bi-directional inertia latching device on a simple and elegant design which, when the seat back is in a reclined position, engages the seat back during rapid deceleration before the seat back is returned to a full upright position.

SUMMARY OF THE INVENTION

In accordance with these and other objects, there is provided a bi-directional inertia latch for reclining seats (having a seat base or seat bottom and a seat back) that is actuated by inertial forces experienced during rapid changes in speed or velocity. The bidirectional inertial latch has support bracket means preferably comprising a pair of brackets securely attached to the seat bottom of the recliner. An arm is pivotally mounted on the support bracket means and securely attached to the seat back. The arm has a lower perimeter section that is preferably sandwiched within the support bracket means. A toothed section is formed about the lower perimeter of the arm and is unitary with the arm. Preferably the unitary toothed section has first and second sections, each with teeth sloped in a circumferential direction. A pawl is pivotally mounted on the support bracket means for movement between a front latching or locking position, a rear latching or locking position, and a non-latching position between the two latching positions. The center of gravity of the pawl is offset from its pivot axis so that the pawl is urged by gravity into the non-latching position when at rest. In addition to gravity, a spring is provided to bias the pawl towards the released position so that the pawl is disengaged from the arm under normal conditions. During rapid deceleration of a motor vehicle, the pawl pivots into the front latching position and during rapid deceleration the pawl moves into the rear latching position. The pawl has a pair of toothed sections for latching or locking engagement with the unitary first and second toothed sections of the arm when the pawl moves into the latching positions.

It is a highly advantageous feature of the present invention to use a pawl that is pivoted into latching positions in response to a rapid change in the velocity of a motor vehicle. Thus, the pawl automatically engages the arm during a rapid change in speed to lock the seat back position. The arm design is simplified, combining a location for attachment to the seat back with operative, locking unitary teeth which engage the teeth of the pawl only upon sudden changes in speed in the motor vehicle. These features allow the bi-directional inertia latch to have an extremely simple and elegant structure, with the pawl acting as the only moving part in the latching or locking operation. Such simple structure not only provides improved reliability but also is easy to manufacture.

From the foregoing disclosure and the following more detailed description of various preferred embodiments it will be apparent to those skilled in the art that the present invention provides a significant advance in the technology and art of inertia latches. Particularly significant in this regard is the potential the invention affords for reduced cost, manufacturing steps and complexity. Additional features and advantages of various preferred embodiments will be better understood in view of the detailed description provided below.

Figure 1:
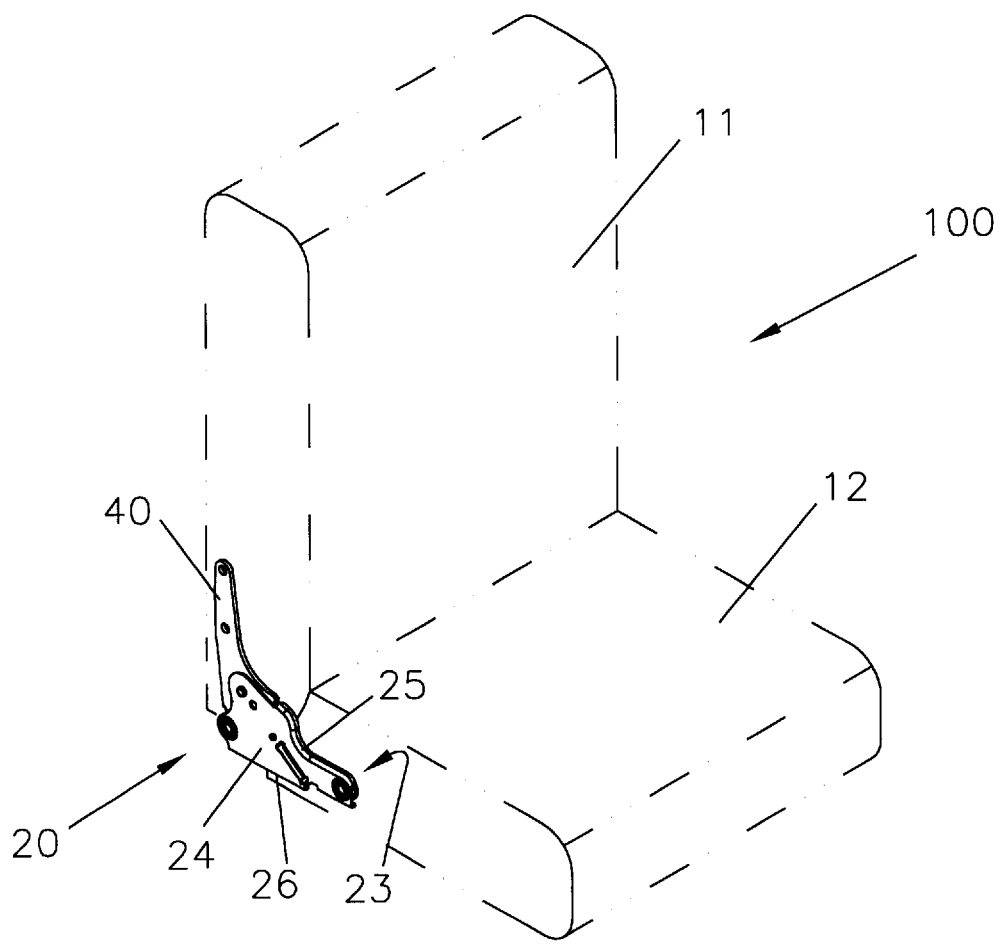
FIG. 1 is a perspective view of a preferred embodiment of a bi-directional inertia latch mounted on a reclining seat exemplifying the practice of the present invention.

It should be understood that the appended drawings are not necessarily to scale, presenting a somewhat simplified representation of various preferred features illustrative of the basic principles of the invention. The specific design features of a bi-directional inertia latch as disclosed here, including, for example, specific dimensions of the teeth and number of the teeth on the arm, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the recliner device illustrated in the drawings. In general, front or frontward refers to a rightward direction in the plane of the paper in FIG. 2, and rear, rearward or backwards refers to a left direction in the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the disclosed here. The following detailed discussion of various alternative and preferred features and embodiments will illustrate the general principles of the invention with reference to a bi-directional inertia latch for use in a reclining motor vehicle seat. Other embodiments suitable for other applications, such as bi-directional inertia latches for armrests, will be apparent given the benefit of this disclosure.

Referring now to the drawings, FIG. 1 is a perspective view of a preferred embodiment of a bi-directional inertia latch 20, which is shown to be mounted on a side of a reclining seat 100 illustrated in dashed lines. The reclining seat 100 has a seat bottom or seat base 12 and a seat back 11. The bi-directional inertia latch 20 has support bracket means which preferably comprise at least a first support bracket 23 securely attached to the seat bottom 12, at mounting locations 39, and a second support bracket 24 fixedly attached to the first support bracket 23.

Optionally, a recliner mechanism (not shown) for comfort adjustment of the seat back 11 can be mounted on an opposite side of the reclining seat 100. Use of the recliner mechanism for ordinary comfort adjustment of the seat back 11 does not actuate the bi-directional inertia latch 20, and the seat back 11 is ordinarily free to pivot relative the seat bottom 12.

In a highly advantageous feature of the invention, the bi-directional inertia latch 20 is a component separate from the recliner. This allows the inertia latch 20 to be positioned independently of the recliner. Additionally, the strength of the bi-directional inertia latch can be increased by using more than one inertia latch. The inertia latches can be stacked, that is, mounted side by side while taking up as little space as possible, or alternatively, the inertia latches can be mounted on each side of the seat 100.

Figure 2:
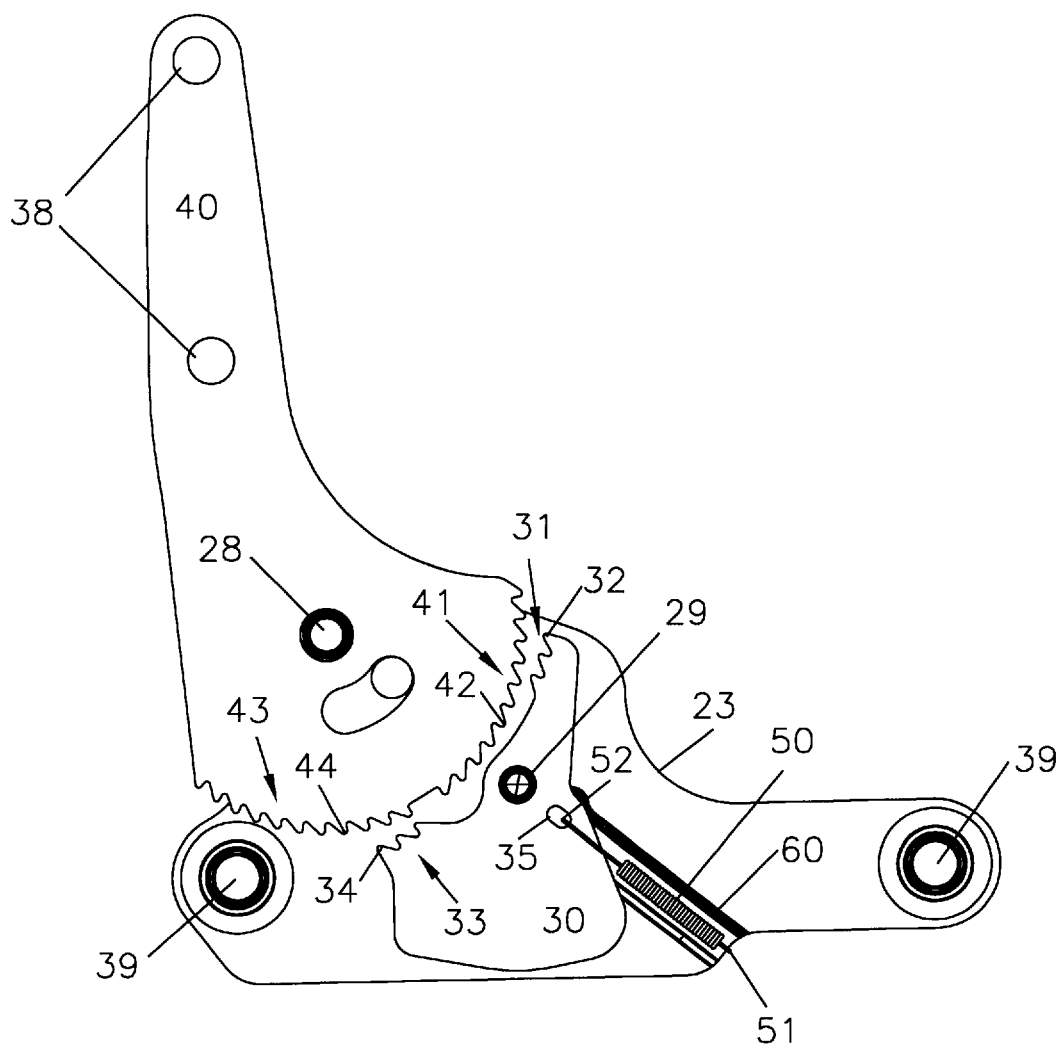
FIG. 2 is a partially-cutaway side view of the bi-directional inertia latch having an arm with a unitary toothed section and a pawl, with the pawl shown in a released or non-locking position.
Figure 3:
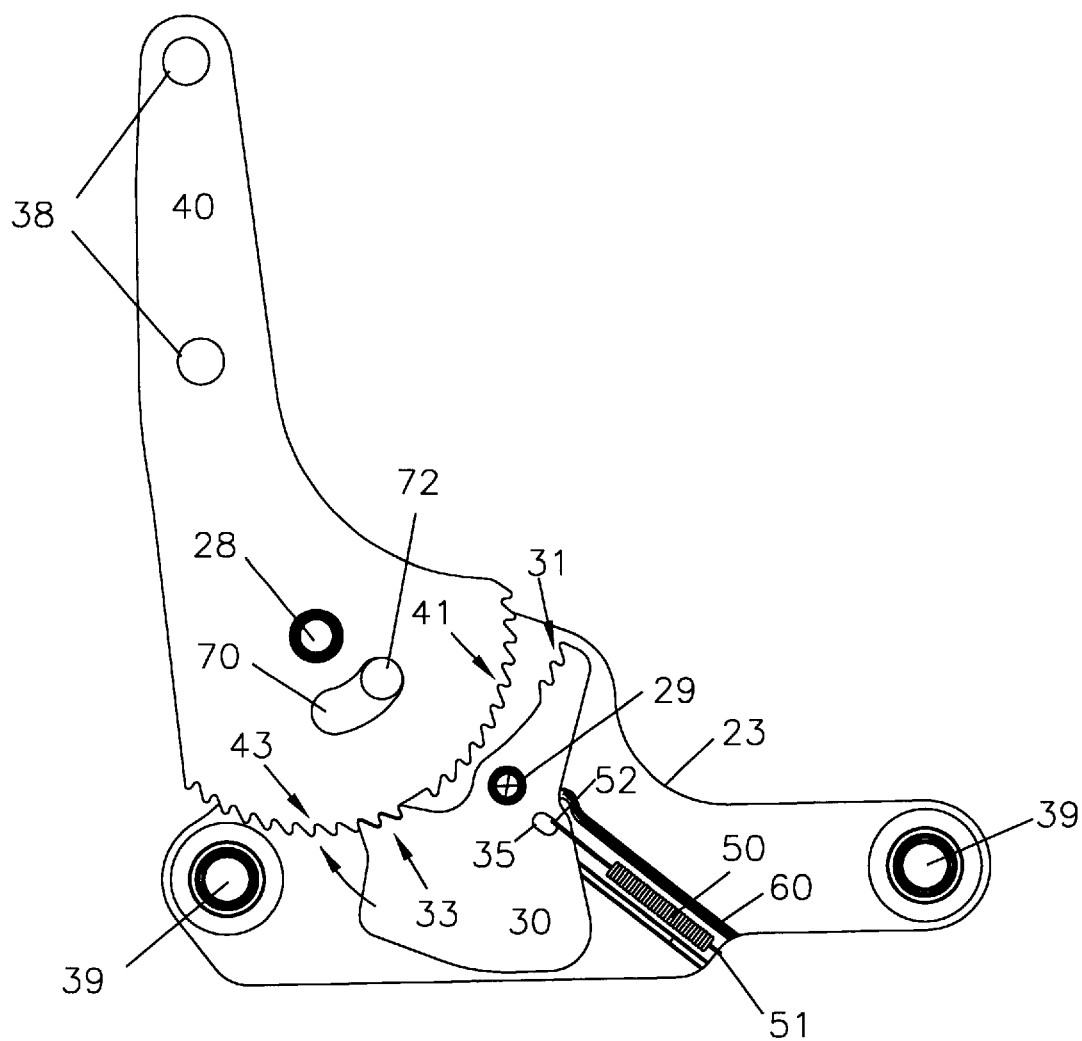
FIG. 3 is similar to FIG. 2 but shows the pawl in a locking position forming latching or locking engagement with the arm in response to a sudden acceleration.
Figure 4:
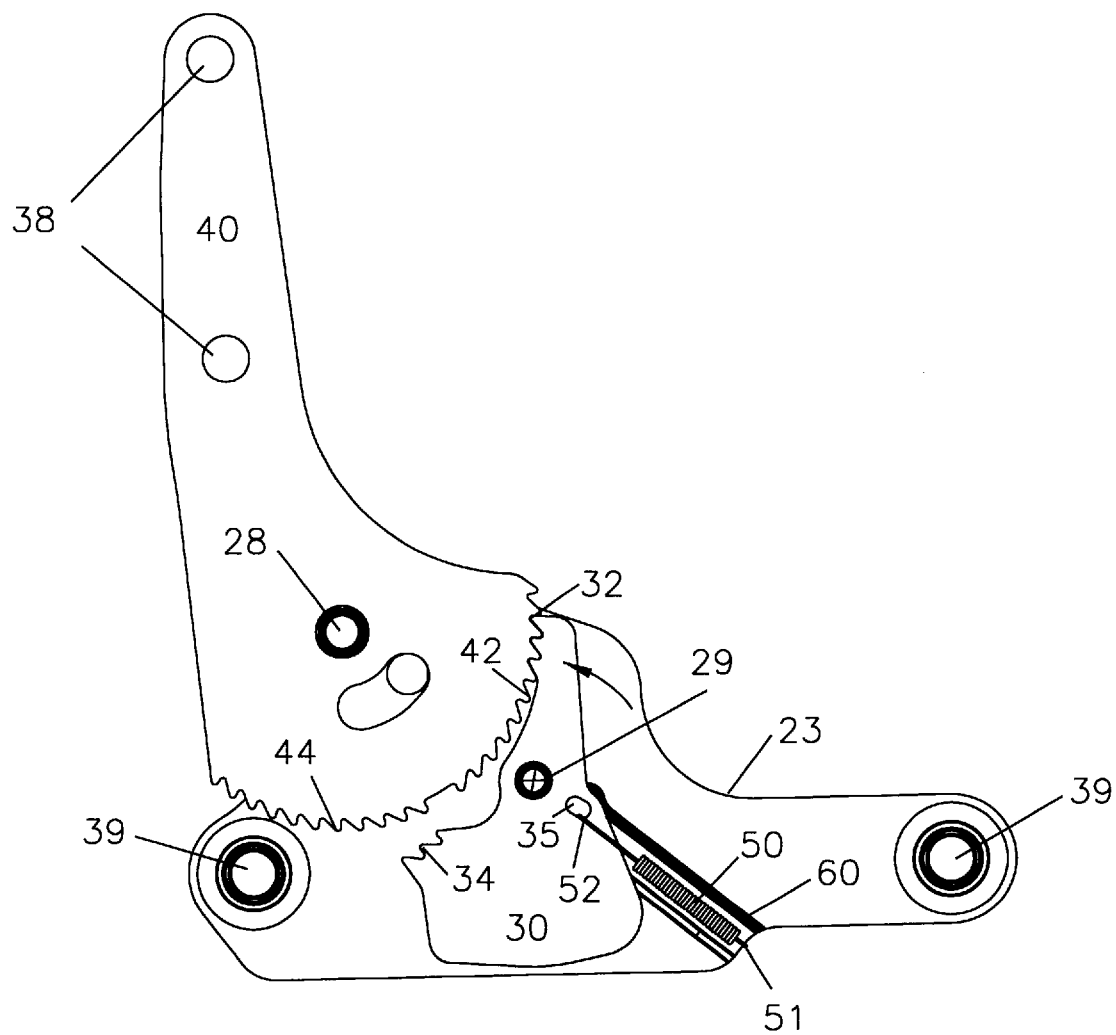
FIG. 4 is similar to FIG. 3 but shows the teeth of the pawl in a locking position with the teeth arm of the arm in response to a sudden deceleration.

FIGS. 2–4 show the bi-directional inertia latch in three different positions: FIG. 2 shows the bi-directional inertia latch in a non- latching or locking position; FIG. 3 shows the bi-directional inertia latch in a rear latching position, and FIG. 4 shows the inertia latch in a front latching position. An arm 40 is shown, securely attached to the seat back 11, preferably by bolts or rivets through openings 38. The arm 40 is pivotally mounted on at least the first support bracket 23 at pivot 28 so that the seat back 11 can be pivoted relative to the seat bottom 12. The arm 40 has a perimeter toothed section comprising a first toothed section 41 and a second toothed section 43. In a highly advantageous feature of the invention, the teeth 42, 44 corresponding to the first and second toothed sections 41, 43 are unitary with the arm 40. This allows a greatly simplified construction of a bi-directional inertia latch in that the pivotable arm 40 is mounted directly to the seat back 11, and also serves as an engaging component of the inertia latch 20. In certain alternative preferred embodiments of the invention the first and second unitary toothed sections 41,43 of the arm need not be separate, but can form a continuous series of teeth running along the perimeter of the arm.

The bi-directional inertia latch includes the arm 40 and a pawl 30 pivotally mounted on at least the bracket 23. The pawl 30 is pivotable between a front latching or locking position, a non-latching position, and a rear latching position. The pawl 30 and the arm 40 form a ratchet system which, when engaged, locks the position of the seat back 11 in either direction, as required to respond to sudden changes in the velocity of the motor vehicle. The pawl 30 has a first toothed section 31 having teeth 32, and a second toothed section 33, having teeth 34. The toothed sections 31, 33 of the pawl 30 are configured for latching engagement with the corresponding toothed sections 41,43 of the arm 40.

The center of gravity of the pawl is such that the force of gravity urges the pawl into the non-latching position shown in FIG. 2. In addition, a spring 50 has a spring end 52 attached at a receiving opening 35 of the pawl and a second spring end 57 attached to at least the bottom edge of the first support bracket 23. Movement of the pawl 30 in either rotatable direction places tension on the spring 50, urging the pawl 30 back to the non-latching position. The threshold level of force caused by rapid acceleration or deceleration can be adjusted by adjusting the spring constant of the spring 50. Preferably the spring rests sandwiched between the first and second brackets 23,24 in a slot 60 in the first bracket 23, and the second bracket 24 has a corresponding slot.

During ordinary operation of the motor vehicle the pawl stays in the released position. Adjustment of the recliner to move the seat back 11 does not cause the pawl 40 to engage the arm 30. However, in response to rapid acceleration of the motor vehicle, the pivotable pawl 40 overcomes the force of gravity and the force of the spring 50 and rotates clockwise as viewed in FIG. 3, such that the teeth 32 on the first toothed section of the pawl 30 engage the teeth 42 of the first unitary toothed section of the arm 40. This prevents additional rotation of the seat back 11. Once the acceleration ends, the spring urges the pawl 30 back to the non-latching position.

Operation of the pawl in response to a rapid deceleration is much the same, just in the opposite direction. In response to rapid acceleration, the pivotable pawl 40 rotates counterclockwise as viewed in FIG. 4, such that the teeth 34 on the second toothed section of the pawl 30 engage the teeth 44 of the second unitary toothed section of the arm 40. This prevents additional rotation of the seat back 11. Once the deceleration ends, the spring urges the pawl 30 back to the non-latching position.

The teeth lock the arm, preventing motion of the seat back, irrespective of whether a recliner is engaged or disengaged, thereby providing a latch which operates continuously. The teeth 42 and 44 of the two toothed sections 41 and 43 are preferably disposed arcuately about the pivot pin 28 of the arm 40 so that the latching or engaged positions of the pawl 30 do not vary with the angular position of the arm 40. To ensure locking engagement between the arm and the pawl, the teeth 42 and 44 on the arm 40 are preferably sloped, and the teeth on the pawl 30 are correspondingly sloped for meshing engagement with the teeth on the arm. The slope of the teeth preferably is such that once the teeth on the arm engage the teeth on the pawl, there is no force component on the teeth which tends to push the pawl 30 away. Since the teeth 42 are provided to prevent the arm 40 from pivoting forward and the teeth 44 are provided to prevent the arm 40 from pivoting backward, the slope of the teeth 42 is opposite to that of the teeth 44. Thus, as illustrated in FIG. 2, first teeth 42 are sloped in the clockwise direction, and second teeth 44 are sloped in the counterclockwise direction.

Because operation of the bi-directional inertia latch 20 is independent of the regular recliner mechanism, the inertia latch 20 can be optimized to provide improved holding force without compromising the seat back position adjustability. For example, the pawl 30 and arm 40 can have relatively large teeth 32,34,42,44 to provide significantly stronger holding force than available with regular recliner devices. At least one tooth must be used on both the first toothed section 31 of the pawl and the second toothed section 33 of the pawl. Preferably at least three teeth are used on each toothed section of the pawl to disperse the load over a large contact surface.

The amount of the angle of desired comfort adjustment will dictate the number of teeth on the unitary toothed section of the arm. The greater the angle, the more teeth will be required. Optionally an additional stop 72 may be attached to bracket 23, to further control the motion of the arm. The slot is slidable in a banana slot 70 in the arm upon rotation of the arm until the stop 72 reaches the end of the slot 70.

In those embodiments using a pair of support brackets, 23, 24, preferably the toothed sections of thee arm and of the pawl are at least sandwiched between the brackets. For further protection from outside elements, either of the brackets or both may have a top segment 25 and a bottom segment 26 which acts to generally "box in" the toothed sections of the arm and pawl, and the spring 50.

Using the inertial forces on the pawl 30 caused by rapid changes in the velocity of the motor vehicle to actuate the bi-directional inertia latch 20 is highly advantageous in that no expensive and complex impact sensing devices or actuating means are necessary for operating the inertia latch. Thus, this feature allows the bi-directional inertia latch to have a very simple and elegant structure, which is inexpensive to manufacture. The simple structure also ensures the reliable operation of the bi-directional inertia latch.

From the foregoing disclosure and detailed description of certain preferred embodiments, it will be apparent that various modifications, additions and other alternative embodiments are possible without departing from the true scope and spirit of the invention. For example, in motor vehicles where additional strength is desired in the event of rapid changes in speed, a pair of bi-directional inertia latches can be can be used, each mounted, for example, on one side of the vehicle seat. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A bi-directional inertia latch comprising, in combination:

support bracket means for mounting other componentry of the bi-directional inertia latch, comprising a first support bracket and a second support bracket, the first support bracket being rigidly attached to a non-pivotable seat base;

an arm, pivotally mounted on the support bracket means formed as a single unit and having a seat back attachment means, and first and second arcuate toothed sections on a periphery of the arm;

a pawl pivotally mounted on the support bracket means for pivotal movement between a front latching position, a rear latching position, and a non-latching position between the two latching positions, being movable into the front latching position in response to a sudden change in velocity in one direction and moveable into the rear latching position in response to a sudden change in velocity in a second direction, having a first toothed section for direct latching engagement with the first toothed section of the arm when the pawl is in the front latching position and a second toothed section unitary with the first toothed section of the pawl for direct latching engagement with the second toothed section of the arm when the pawl is in the rear latching position; and a spring biasing the pawl towards the non-latching position, attached at one end to the pawl and at a second end to the first support bracket;

wherein the support bracket means has a slot and the spring is seated in the slot.

2. The bi-directional inertia latch of claim 1 wherein the pawl has a slot and the one end of the spring is attached to the pawl at the slot.

3. The bi-directional inertia latch of claim 1 wherein the pawl is sandwiched between the first support bracket and the second support bracket.

4. The bi-directional inertia latch of claim 3 wherein the second support bracket is fixedly attached to the first support bracket and the second support bracket has a base segment and a top segment.

5. The bi-directional inertia latch of claim 1 wherein the pawl is pivotably freely mounted at a point spaced from its center of gravity.

6. The bi-directional inertia latch of claim 1 wherein a force of gravity on the pawl urges the pawl towards the non-latching position.

7. The bi-directional inertia latch of claim 1, wherein the first and second arcuate toothed sections of the arm are formed as unitary extensions of the arm.

8. The bi-directional inertia latch according to claim 7, wherein the first toothed section includes at least one tooth sloped in a first circumferential direction, and wherein the second toothed section includes at least one tooth sloped in a direction opposite to the first circumferential direction.

9. The bi-directional inertia latch of claim 1 wherein the first and second toothed sections of the pawl each has at least three teeth.

10. The bi-directional inertia latch of claim 1 further comprising a banana slot in the arm and a stop insertable into the banana slot restricting the travel of the arm.

11. The bi-directional inertia latch of claim 1 wherein the seat back attachment means comprises through-holes for receiving mounting bolts.

12. The bi-directional inertia latch of claim 1 wherein the first support bracket has a bottom segment extending toward the second support bracket, and the second support bracket has a top segment extending toward the first support bracket, and the first support bracket, second support bracket, top segment and bottom segment cooperate to box in the spring and the toothed sections of the arm and the pawl.

13. An inertia latch comprising, in combination:
    support bracket means for mounting other componentry of the inertia latch, comprising a first support bracket having a bottom edge and a second support bracket rigidly attached to a non-pivotable seat base;
    an arm pivotably mounted on the support bracket means formed as a single unit with a seat back attachment means, and having first and second arcuate toothed sections on a periphery of the arm;
    a pawl pivotally mounted on the support bracket means about a pivot pin and pivotable between a front latching position, a rear latching position, and a non-latching position between the two latching positions, the pawl pivotably freely mounted at a point spaced from its center of gravity, responsive to sudden acceleration to move into the front latching position and to sudden deceleration to move into the rear latching position, the pawl further having a third toothed section for direct latching engagement with the first toothed section when the pawl is in the front latching position and a fourth toothed section unitary with the third toothed section of the pawl for direct latching engagement with the second toothed section when the pawl is in the rear latching position; and
    a spring seated in a slot in the support bracket means and having a first end and a second end, attached at one end to the bottom edge of the first support bracket and at the other end to the pawl, biasing the pawl toward the non-latching position.

14. The inertia latch of claim 13 wherein the slot in the support bracket means comprises a slot in the first support bracket and a slot in the second support bracket cooperating to seat the spring a first bracket slot and a second bracket slot corresponding to the first bracket slot.

15. The inertia latch of claim 13 wherein the third toothed section of the pawl has at least three teeth and the fourth toothed section of the pawl has at least three teeth.

16. A recliner according to claim 13, wherein the first and second arcuate toothed sections of the arm are formed as unitary extensions of the arm, and the first toothed section includes teeth sloped in a first circumferential direction, and the second toothed section includes teeth sloped in a direction opposite the first circumferential direction.

17. The inertia latch of claim 13 wherein the first support bracket has a top segment extending toward the second support bracket, and the second support bracket has a bottom segment extending toward the first support bracket, and the first support bracket, second support bracket, top segment and bottom segment cooperate to box in the spring and the toothed sections of the arm and the pawl.

18. A seat comprising, in combination:
    a seat base mounted to a floor of a motor vehicle;
    a seatback adjustably mounted to the seat base;
    a recliner connecting the seat base to the seatback and allowing for adjustment of the position of the seatback relative the seat base; and
    a bi-directional inertia latch, securing the seatback in a locked position when the seat is subjected to a rapid change in force, the bi-directional inertia latch comprising:
        a first support bracket fixedly attached to the seat base,
        a second support bracket fixedly attached to the first support bracket,
        an arm formed as a single unit and having a seatback attachment means for attachment to the seat back, the arm further comprising an arcuate toothed section formed on a periphery of the arm,
        a pawl pivotally mounted on the first support bracket for movement between a first latching position, a second latching position and a non-latching position, the pawl having a first toothed section for direct latching engagement with the arcuate toothed section of the arm when the pawl is in the first latching position and a second toothed section unitary with the first toothed section for direct latching engagement with the arcuate toothed section of the arm when the pawl is in the second latching position, the toothed sections of the pawl and the arcuate toothed section of the arm being spaced apart in the non-latching position, and biasing means for biasing the pawl towards the non-latching position, whereby the pawl is responsive to sudden decreases in velocity sufficient to overcome the biasing means to pivotally move from the non-latching position to the first latching position, and the pawl is responsive to sudden increases in velocity sufficient to overcome the biasing means to pivotably move from the non-latching position to the second latching position, the biasing means comprising a spring seated in a slot form in both the first and second support brackets, which is attached at a first end to the pawl and at a second end to a bottom edge of the first support bracket;
    wherein the first support bracket has a top segment extending toward the second support bracket, and the second support bracket has a bottom segment extending toward the first support bracket, and the first support bracket, second support bracket, top segment and bottom segment cooperate to box in the spring and the toothed sections of the arm and the pawl.

19. The seat of claim 18 wherein the pawl and the unitary toothed section of the arm are sandwiched between the first bracket and the second bracket.

* * * * *